United States Patent Office 3,449,125
Patented June 10, 1969

3,449,125
ACCESS TIME IN LIGHT-DEVELOPABLE DIRECT-WRITING SILVER HALIDE EMULSIONS THROUGH USE OF A REDUCTION SENSITIZER
John Howard Bigelow, Rochester, N.Y., assignor to E. I. du Pont de Nemours and Company, Wilmington, Del., a corporation of Delaware
No Drawing. Filed Dec. 23, 1965, Ser. No. 516,138
Int. Cl. G03c 1/28
U.S. Cl. 96—108
5 Claims

ABSTRACT OF THE DISCLOSURE

Preparation of light-developable direct-writing silver halide emulsions by admixing silver and plumbous salts with an acid solution of an organic colloid, ripening the emulsion, redispersing the emulsion, adding a reduction sensitizer digesting the resulting emulsion, adjusting the pH to about 8 for 5–15 minutes, and adjusting to pH 7 or below and adding a halogen acceptor.

---

This invention relates to the preparation of radiation-sensitive elements and, more particularly, of light-developable, direct-writing, radiation-sensitive silver halide elements.

It is known that light-developable, direct-writing silver halide emulsions can be made by incorporating therewith after precipitation from 0.5 to 120 or more mole percent of a stannous salt per mole of silver as a halogen acceptor and other adjuvants, e.g., plumbous salts. See U.S. Patents Hunt 3,033,678 and 3,033,682, and Bigelow 3,178,293. While the emulsions are superior in many respects to other direct-writing emulsions, they require longer light-development periods to produce a visible image.

Improved practical, light-developable, direct-writing silver halide emulsions having reduced photolyzed image access timing during light development can be made in accordance with the process of this invention which comprises (1) Admixing aqueous silver nitrate and from 0.33 to 10 mole percent based on the silver of a water-soluble plumbous salt, with an acidified aqueous solution of a water-soluble halide containing a water-permeable organic colloid binding agent;

(2) Ripening the precipitated silver halide emulsion;

(3) Optionally coagulating the ripened emulsion, washing the coagulum and redispersing the resulting coagulum;

(4) Forming an aqueous redispersion of the silver halide emulsion and adding to the redispersed emulsion from 0 to 5 mole percent of a water-soluble plumbous salt, 0 to 120 mole percent of a water-soluble bromide and 0.2 to 20 mole percent of a reduction sensitizer, each being based on the silver halide; and (5) Digesting the resulting emulsion and cooling it to coating temperature; characterized by the additional steps of (6) Adjusting the resulting emulsion to a pH of approximately 8 and holding at the coating temperature for approximately 5 to 15 minutes; and (7) Adjusting the resulting emulsion to pH 7 or below and adding at least one or more halogen acceptors.

The final emulsion is then coated on a suitable film, paper or other support.

Preferably the reduction sensitizer and the halogen acceptor in the above-described process is a water-soluble stannous salt acting in a dual role. At a pH of 8 or above it acts as a powerful reduction sensitizer in a preferred amount of about 2.0 mole percent, and at a pH of 7 or below it acts in the role of a halogen acceptor. Other known reduction sensitizers may also be used, i.e. ferrous sulfate, potassium ferrocyanide, dibutyl hydrogen phosphite, etc.

The plumbous salt is added so that at least part of it is present at the time of precipitation of the silver halide. Precipitation is preferably carried out by using potassium chloride and/or potassium bromide as the water-soluble halide salts. The precipitation is carried out by slowly adding an aqueous solution of the silver nitrate and plumbous salt to an acidified aqueous solution of a water-soluble organic colloid dispersing agent, e.g., gelatin. In the case of silver bromide gelatin emulsions, it has been found advantageous to add the soluble bromide salts in an amount sufficient to provide a considerable excess of bromide over that which is necessary to react with the silver nitrate.

Various water-soluble halides, e.g., potassium, sodium and ammonium chloride and bromide can be used. Other halogen acceptors may be used in place of the stannous salt, e.g., the sulfur-containing compounds of British specification 724,001. After precipitation and ripening, the emulsion may or may not be, but preferably is, washed as described in Moede U.S.P. 2,772,165. The emulsion is redispersed and digested in the conventional manner. At this point, or prior to digestion, optional sensitizing dyes may be optionally added to increase the spectral response of the emulsion layer for use in instruments employing a variety of light sources. During this step, from 0 to 5 percent of a water-soluble plumbous salt and from 0 to 120 mole percent of a soluble bromide salt, all based on the silver halide, are added. After the digestion step, the emulsion is cooled to a temperature 80° to 100° F., a pH buffer is added as are coating aids and hardeners and the pH is adjusted to at least 8 by addition of conventional alkaline and/or acid materials. The emulsion is held at this temperature for 5 to 15 minutes and then the pH is lowered to 7 or below and the halogen acceptors added. The viscosity is adjusted as desired by the addition of a further amount of gelatin or other colloid. In general, the ratio of gelatin to silver halide is 2:1; however, this is not at all critical. The prepared emulsion is then coated on a suitable support and dried.

To determine the sensitometric characteristics of the material it may be exposed through a power of 2 step-wedge in an electronic flash sensitometer, e.g., that described by Wycoff and Edgerton, J.S.M.P. & T.V. Eng., vol. 66, 474 (1957). Relative sensitivities of materials measured with this instrument can be expressed as steps recorded in the image. The exposed material may be light-developed or photolyzed by exposure to room lighting or with light from a fluorescent cool white lamp at 95 foot candles intensity. The images become easily visible in approximately 0.1 to 15 seconds although longer times may be used. To determine the densities of the image and background, a reflection densitometer may be used whose values correspond to visual density.

In place of the gelatin binding agent used in the following examples, there can be substituted other natural or synthetic water-permeable organic colloid binding agents that are described in U.S. Patents 2,276,322, 2,495,918, 2,833,650 and Cohen et al. 3,035,881.

Suitable supports for the novel photographic emulsions of this invention include those used in the prior art for light-writing and oscillographic recording, including those described in the Hunt and Bigelow patents given above.

In order to more specifically illustrate the features of this invention, the following examples are set forth below. They are not intended to limit the scope of the invention except as set forth in the claims.

Example I

A gelatino silver chlorobromide emulsion was made by slowly adding an aqueous solution containing a mixture of 1 mole of silver nitrate and 0.033 mole of plumbous nitrate to a gelatin solution containing 1 mole of potassium chloride acidified with 0.05 mole of hydrochloric acid. The precipitation was carried out under a red safelight. The temperature at precipitation and for 40 minutes thereafter was held at 160° F. After precipitation an aqueous solution of 1.6 moles of potassium bromide was added while the mixture was held at 160° F. The resulting emulsion was coagulated, washed and redispersed in a manner similar to that described in assignee's Moede U.S. Patent 2,772,165. A mixture of the redispersed emulsion, gelatin necessary to provide about 9% concentration for coating, an optical sensitizing dye, 0.0067 mole of plumbous nitrate, 0.6 mole of potassium bromide, and as a reduction sensitizer, 0.02 mole of stannous chloride ($SnCl_2$) per mole of silver bromide was digested for 30 minutes at 130° F. After digestion, the mixture was cooled to coating temperature, borax was added as a buffer, coating aids and chrome alum were added and the pH of the emulsion was adjusted to 8 with dilute aqueous sodium carbonate solution. The mixture was held 10 minutes and then an alcoholic solution of 0.5 gram of iodine was added. The pH of the mixture was adjusted to 7 with hydrochloric acid and 0.1 mole of stannous chloride was added. After adjusting to a suitable viscosity, the emulsion was coated on a paper support to give a dry coating weight equivalent to 30 mg. of silver bromide per square decimeter. The coated emulsion was dried in a conventional manner.

A sample of the coated material together with a control made in the manner of Example I of assignee's Bigelow, U.S. Patent 3,178,293 were each given an exposure of 1000 microseconds in the flash tube sensitometer described above using a power of 2 stepwedge. The exposed elements were photolyzed by irradiation from daylight fluorescent tubes at an intensity level of 50 foot-candles for 4 minutes. The densities were read on a reflection desitometer to give the following results:

| Sample | Speed | $D_{max.}$ | Bkgd. | Total Dens. | Access |
|---|---|---|---|---|---|
| Reduction sensitized with stannous chloride | 13.7 | .37 | .43 | .80 | 1 |
| Control | 16.4 | .36 | .38 | .74 | 2 |

Speed=100/E at a density of 0.04 above background.
$D_{max.}$=density difference between background and maximum density.
Bkgd.=density difference between white paper and non-image areas of light-developed sample.
Total Dens.=$D_{max.}$+background densities.
Access=arbitrary rating of access time in which 1 is the fastest as applied to samples exposed in the sensitometer as described above and photolyzed under cool white fluorescent lamp at 95 foot candles.

Example II

Example I was repeated except that the silver chloride precipitation and potassium bromide conversion temperature is 145° F instead of 160° F.

SENSITOMETER

| Sample | Speed | $D_{max.}$ | Bkgd. | Total Dens. | Access |
|---|---|---|---|---|---|
| Reduction sensitized | 18.2 | .30 | .38 | .68 | 1 |
| Control | 16.4 | .36 | .38 | .74 | 2 |

Example III

Example I was repeated up to the point of redispersing the coagulated and washed emulsion. A mixture of the redispersed emulsion, gelatin necessary to provide about 9% concentration for coating, an optical sensitizing dye, 0.6 mole potassium bromide and 0.02 mole of stannous chloride per mole of silver bromide was digested for 20 minutes at 130° F. After digestion, the mixture was cooled to coating temperature, borax was added as a buffer, coating aids and chrome alum were added and the pH of the emulsion was adjusted to 8 with dilute aqueous sodium carbonate solution. The mixture was held for 10 minutes and then an alcoholic solution of 0.5 gram of iodine was added. The pH of the mixture was reduced to 3.5 with dilute hydrochloric acid and 0.01 mole potassium iodide plus 0.2 mole of potassium thiocyanate were added. After adjusting to suitable viscosity the emulsion was coated on a paper support to give a dry coating weight equivalent to 30 mg. of silver bromide per square decimeter. The coated emulsion was dried in a conventional manner.

The following sensitometry and access time, determined as described in Example I, were obtained:

| Sample | Speed | $D_{max}$ | Bkgd. | Total Dens. | Access |
|---|---|---|---|---|---|
| Reduction sensitized | 9.33 | .34 | .24 | .58 | 1 |
| Control | 16.4 | .36 | .38 | .74 | 2 |

Example IV

Example I was repeated except that in three different emulsions there were used as reduction sensitizers respectively: 11.1 grams of ferrous sulfate ($FeSO_4 \cdot 7H_2O$), 16.87 grams of potassium ferrocyanide, [$K_4Fe(CN)_6$] and 4 grams of dibutyl hydrogen phosphite, [$(C_4H_9)_2H\ PO_3$].

The following sensitometric results and access time ratings determined as described in Example I were obtained:

| Sample | Speed | $D_{max}$ | Bkgd. | Total Dens. | Access time |
|---|---|---|---|---|---|
| $FeSO_4.7H_2O$ | 13.7 | .19 | .36 | .55 | 1 |
| $K_4Fe(CN)_6$ | 18.2 | .22 | .37 | .59 | 1 |
| $(C_4H_9)_2H\ PO_3$ | 4.9 | .16 | .34 | .50 | 1 |
| Control | 16.4 | .36 | .38 | .74 | 2 |

Stannous chloride may be added, in either its role as a reduction sensitizer, or as a halogen acceptor, from an aqueous solution, particularly when such solutions are made using the anhydrous stannous compound.

Where it is desired, other halides or combination of halides may be used to form the silver halide grains. For example, pure silver chloride, or pure chlorobromide may be used. Where soluble chloride salts are used it is desirable, because of solubility differences, to form the silver halide grains of desired composition and size and then add sufficient soluble bromide salts to provide the desired concentration of bromide ions. The role of the lead salt at precipitation is not fully understood but it is believed that its presence in the silver halide crystal makes the internal latent image formed by the high intensity writing trace more easily available which is not the case when the lead salt is added at a later stage of the emulsion preparation. The addition of lead salts at a later stage appears to suppress the sensitivity in the unexposed areas of the emulsion layer.

The role of aa strong reduction sensitizer appears to be that of providing a Ag°-rich silver halide crystal system during the remelting and digestion stages which greatly reduces the access time to the latent image by light-development.

The novel process of this invention produces light-developable, direct-writing, photosensitive emulsion layers and elements having several advantages over the prior art products. The emulsion layers and elements of this invention upon exposure to high-intensity radiation and subsequent light development yield visible images in a much shorter time than was possible with direct-writing elements known heretofore. This has been accomplished without deleteriously affecting image stability to ambient light, or maximum density or contrast and other advantages set forth in the above disclosed patents.

The embodiments of the invention in which an exclusive property or privilege is claimed are defined as follows:

1. A process for making light-developable, direct-writing silver halide emulsions which comprises
   (a) admixing aqueous silver nitrate and from 0.33 to 10 mole percent based on the silver of a water-soluble plumbous salt, with an acidified aqueous solution of a water-soluble halide containing a water-permeable organic colloid binding agent;

(b) ripening the precipitated silver halide emulsion;

(c) forming an aqueous redispersion of the silver halide emulsion and adding to the redispersed emulsion from 0 to 5 mole percent of a water-soluble plumbous salt, 0 to 120 mole percent of a water-soluble bromide, and 0.2 to 20 mole percent of a reduction sensitizer, each being based on the silver halide, and (d) digesting the resulting emulsion and cooling it to coating temperature; characterized by the additional steps of (e) adjusting the resulting emulsion to a pH of approximately 8 and holding at the coating temperature for approximately 5 to 15 minutes; and (f) adjusting the resulting emulsion to pH 7 or below and adding at least one or more halogen acceptors.

2. A process according to claim 1 wherein the ripened emulsion is washed before step (c).

3. A process according to claim 1 wherein the reduction sensitizer is a water-soluble stannous salt.

4. A process according to claim 1 wherein the reduction sensitizer is stannous chloride.

5. A process according to claim 1 wherein the coating temperature is 80 to 100° F.

References Cited

UNITED STATES PATENTS 3,178,293  4/1965  Bigelow _____ 96—50 XR

J. TRAVIS BROWN, *Primary Examiner.*

J. R. EVERETT, *Assistant Examiner.*

U.S. Cl. X.R.

96—119